US007109475B1

(12) United States Patent
Hardman et al.

(10) Patent No.: US 7,109,475 B1
(45) Date of Patent: Sep. 19, 2006

(54) LEADING EDGE/TRAILING EDGE TOF DETECTION

(75) Inventors: Mark E. Hardman, Sunnyvale, CA (US); Lee Earley, Mountain View, CA (US); Adrian Land, San Carlos, CA (US)

(73) Assignee: Thermo Finnigan LLC, San Jose, CA (US)

( * ) Notice: Subject to any disclaimer, the term of this patent is extended or adjusted under 35 U.S.C. 154(b) by 0 days.

(21) Appl. No.: 11/116,707

(22) Filed: Apr. 28, 2005

(51) Int. Cl.
*H01J 49/40* (2006.01)
*B01D 59/44* (2006.01)

(52) U.S. Cl. ...................... 250/287; 250/281; 250/282; 250/286; 250/294

(58) Field of Classification Search ................. 250/287
See application file for complete search history.

(56) References Cited

U.S. PATENT DOCUMENTS

| | | | | |
|---|---|---|---|---|
| 3,867,613 | A * | 2/1975 | Schoon | 377/10 |
| 3,887,764 | A * | 6/1975 | Gibbons et al. | 348/79 |
| 4,490,806 | A | 12/1984 | Enke et al. | |
| 4,691,160 | A | 9/1987 | Ino | |
| 5,365,516 | A * | 11/1994 | Jandrell | 370/335 |
| 5,367,162 | A | 11/1994 | Holland et al. | |
| 5,463,219 | A | 10/1995 | Buckley et al. | |
| 5,526,357 | A * | 6/1996 | Jandrell | 370/346 |
| 5,777,326 | A * | 7/1998 | Rockwood et al. | 250/287 |
| 5,982,841 | A * | 11/1999 | Terada et al. | 377/20 |
| 6,094,627 | A | 7/2000 | Peck et al. | |
| 6,172,557 | B1 * | 1/2001 | Terada et al. | 329/341 |
| 6,218,869 | B1 * | 4/2001 | Hongbin Hao et al. | 327/24 |
| 6,229,142 | B1 * | 5/2001 | Bateman et al. | 250/287 |
| 6,373,052 | B1 | 4/2002 | Hoyes et al. | |
| 6,434,211 | B1 * | 8/2002 | Lloyd et al. | 377/20 |
| 6,646,252 | B1 * | 11/2003 | Gonin | 250/287 |
| 6,865,137 | B1 * | 3/2005 | Lyon et al. | 367/13 |
| 7,012,248 | B1 * | 3/2006 | Paschalidis | 250/287 |
| 2005/0061968 | A1 * | 3/2005 | Green | 250/288 |
| 2005/0211893 | A1 * | 9/2005 | Paschalidis | 250/287 |

FOREIGN PATENT DOCUMENTS

| | | |
|---|---|---|
| WO | WO 98/40907 | 9/1998 |
| WO | WO 02/097856 | 12/2002 |

* cited by examiner

*Primary Examiner*—John R. Lee
*Assistant Examiner*—Bernard E. Souw
(74) *Attorney, Agent, or Firm*—Charles B. Katz; Carr & Ferrell LLP

(57) ABSTRACT

Disclosed are a time-of-flight mass spectrometer and signal processing electronics. The signal processing electronics include a plurality of time-to-digital converters configured to receive signal pulses from the same detector anode within the time-of-flight mass spectrometer. The signal processing electronics are further configured to differentiate, and compensate for, those signal pulses caused by the detection of more than one ion. Differentiation and compensation are achieved by using the time-to-digital converters to detect the leading and trailing edges of a signal pulse. The time difference between the detection of the leading edge and detection of the trailing edge is indicative of whether or not the signal pulse was generated by the detection of more than one ion.

10 Claims, 5 Drawing Sheets

LEADING EDGE/TRAILING EDGE TOF DETECTION

BACKGROUND

1. Field of the Invention

The invention is in the field of mass spectrometry, and in particular detection electronics for time-of-flight mass spectrometry.

2. Related Art

Time-of-flight mass spectrometry (TOFMS) is based upon the principle that ions of different mass-to-charge ratios that are accelerated to the same kinetic energy travel at different velocities. As such, ions of a first mass-to-charge ratio will take a different amount of time to travel a fixed distance than ions of a second mass-to-charge ratio. By detecting the arrival times of ions at the end of the fixed distance, a mass spectrum can be generated.

TOFMS is typically operated in a so-called cyclic mode, in which successive bunches of ions are accelerated to a kinetic energy, separated in flight according to their mass-to-charge ratios, and then detected. In each cycle a complete mass spectrum can be recorded. However, typically, the results of many cycles are combined to generate a mass spectrum with improved signal to noise ratios.

One of the primary challenges in TOFMS is to maximize the dynamic range of detectable ion signals. The dynamic range is limited by the detector and subsequent signal processing electronics. The challenge is to simultaneously determine the number of ions detected and their arrival times. In some situations it is desirable to determine arrival times to within nanosecond or sub-nanosecond time scales. Thus, the detector and signal processing electronics must be able to quantitatively record events in very rapid succession.

Signal processing electronics for use in TOFMS systems typically fall into two classifications, transient recorders and time-to-digital converters (TDCs). In all of these systems detected signals are divided into separate "time bins" responsive to when they were detected. In the art, the term "time bin" can refer to either a time interval or a field within a data buffer used to store data regarding events that occurred during that time interval. Each time bin is associated with a particular time relative to a trigger signal.

Transient recorders include analog-to-digital converters (ADCs) configured to convert an electronic signal received from a detector anode to a digital value. Transient recorders typically have a dynamic range of 8, 12 or 16 bits in signal intensity. A separate analog-to-digital conversion occurs for each time bin of a transient recorder. There can be many thousands of time bins and thus a significant amount of data to generate process and store. The time required to perform each analog-to-digital conversion and transfer the result to an electronic storage location limits the maximum time resolution and duty cycle of transient recorders.

Because of the limitations of transient recorders, most high resolution time-of-flight mass spectrometry is performed using TDCs. TDCs employ an ion counting approach that eliminates the need for multi-bit analog-to-digital conversion and for rapid storage of multi-bit data. TDCs typically have advantages over transient recorders in terms of cost and detector compatibility.

In the ion counting approach used by TDCs, if an ion is detected in a specific time bin then a "1" is placed in that time bin, otherwise a "0" is placed in that time bin. Thus, TDCs have a dynamic range of one bit. The bit is turned on (switched from zero to one) by comparing the received electronic signal with a reference voltage at the time represented by each time bin. This comparison is typically made using a discriminator. The impact of a single ion is, thus, converted to a first binary value, e.g., 1 and the lack of impact is represented as a second binary value (e.g., 0). A mass spectrum is generated by summing the 1-bit TDC data over many measurement (e.g., data acquisition) cycles. Typically, this summation takes place within a memory included within the TDC. A prior art TDC is capable of detecting at most one type of event at a time. Thus, by appropriate selection of discriminator logic, a prior art TDC can be configured to detect a rising edge of a pulse or, alternatively, a falling edge of a pulse, but not both at the same time.

There are, however, several disadvantages to TDCs. First, the output of the TDC will be a "1" regardless of whether one, two or more ions are received by the detector within the same time bin. This can result in a bias against stronger signals and suppression of some peaks in the final summed mass spectrum. Second, TDCs are subject to a "dead-time." Dead-time is a time immediately following the detection of an event (in this case the arrival of an ion) during which no further events can be distinguished. Thus, if a subsequent ion arrives during the dead-time caused by the arrival of a first ion, the subsequent ion will not be detected as a separate event. In addition, the arrival of the subsequent ion can extend the duration of the dead-time. Thus, there is a bias in which earlier ions may be digitized by the TDC, while later ones may not.

The above problems with TDCs result in peak distortion in resulting mass spectra. Observed peaks can be reduced in absolute height, since some ions are not counted. When this occurs, the resulting mass spectrum will include unrepresentative peak ratios. Observed peaks can also be shifted in time because of the bias toward the first ions to be received. When this occurs, the peak may be assigned an inaccurate mass-to-charge ratio. In TOFMS this is referred to as a mass shift. Both of the above effects are undesirable.

One solution to peak distortion caused by dead-time is to keep the ion detection rates so low that the peak distortions become negligible. However, if the ion detection rates are too low, the sensitivity and dynamic range of the analysis are adversely affected. Another solution is to apply statistical corrections to the summed mass spectrum in order to minimize the impact of dead-time. However, these corrections are typically only appropriate over a relatively limited range.

Other approaches to solving peak distortion problems caused by dead-time have included using multiple detection anodes, each with a separate TDC, or the use of a transient recorder in parallel with a TDC.

All of these approaches have disadvantages associated with cost, dynamic range, cross-talk, data processing, and the like. There is, therefore, a need for improved methods of ion detection using TDCs.

SUMMARY

Various embodiments of the invention include signal processing electronics configured to process signals resulting from the detection of ions in a time-of-flight mass spectrometer. These signal processing electronics include dual time-to-digital converters including discriminators. One of the dual time-to-digital converters is configured to detect and digitize the leading edge of a signal pulse and the other of the dual time-to-digital converters is configured to detect and digitize the trailing edge of the same signal pulse. Using the detection times of the leading and trailing edges, signal processing electronics are able to compensate for the occurrence of signal pulses that result from the detection of more than one ion. For example, in some embodiments, signal pulses resulting from the detection of a single ion are differentiated from signal pulses resulting from the detection of more than one ion using the time between a leading edge and a trailing edge of a signal pulse.

The signal processing electronics of the invention can also be adapted to other signal processing technologies.

Various embodiments of the invention include a pulse detection system comprising a first circuit configured to generate a first result within one of a plurality of time bins responsive to detection of a leading edge of a signal pulse, the signal pulse being generated using a time-of-flight mass spectrometer, a second circuit configured to generate a second result responsive to detection of a trailing edge of the signal pulse, and logic configured to generate a third result, using the first result and the second result, responsive to whether or not the signal pulse was generated by the detection of more than one ion.

Various embodiments of the invention include a time-of-flight mass spectrometer comprising an ion source, an ion detector configured to detect ions received from the ion source, and a pulse detection system including first time-to-digital conversion electronics configured to detect a leading edge of a signal pulse generated by the ion detector, and to generate a first result responsive to the detection of the leading edge, the first result being associated with a first time, second time-to-digital conversion electronics configured to detect a trailing edge of the signal pulse and to generate a second result responsive to the detection of the trailing edge, the second result being associated with a second time, and logic configured to generate a third result using the first time and the second time.

Various embodiments of the invention include a method of processing a signal from a time-of-flight mass spectrometer, the method comprising receiving the signal from the time-of-flight mass spectrometer, the signal including a signal pulse, detecting a leading edge of the signal pulse, generating a first result responsive to the detection of the leading edge, the first result being associated with a first of a plurality of time bins, detecting a trailing edge of the signal pulse, generating a second result responsive to the detection of the trailing edge, the second result being associated with at a second of the plurality of time bins, and generating a third result responsive to the first result and the second result, the third result being associated with a third of the plurality of time bins.

Various embodiments of the invention include a time-of-flight mass spectrometer comprising an ion source, an ion detector configured to detect ions received from the ion source and to generate a signal pulse responsive to the detection of one ion or a plurality of ions, means for detecting a leading edge of the signal pulse, means for detecting a trailing edge of the signal pulse, and means for processing the signal pulse responsive to whether the signal pulse was generated in response to detection of one ion or generated in response to detection of more than one ion.

BRIEF DESCRIPTION OF THE VARIOUS VIEWS OF THE DRAWINGS

DETAILED DESCRIPTION

Figure 1:
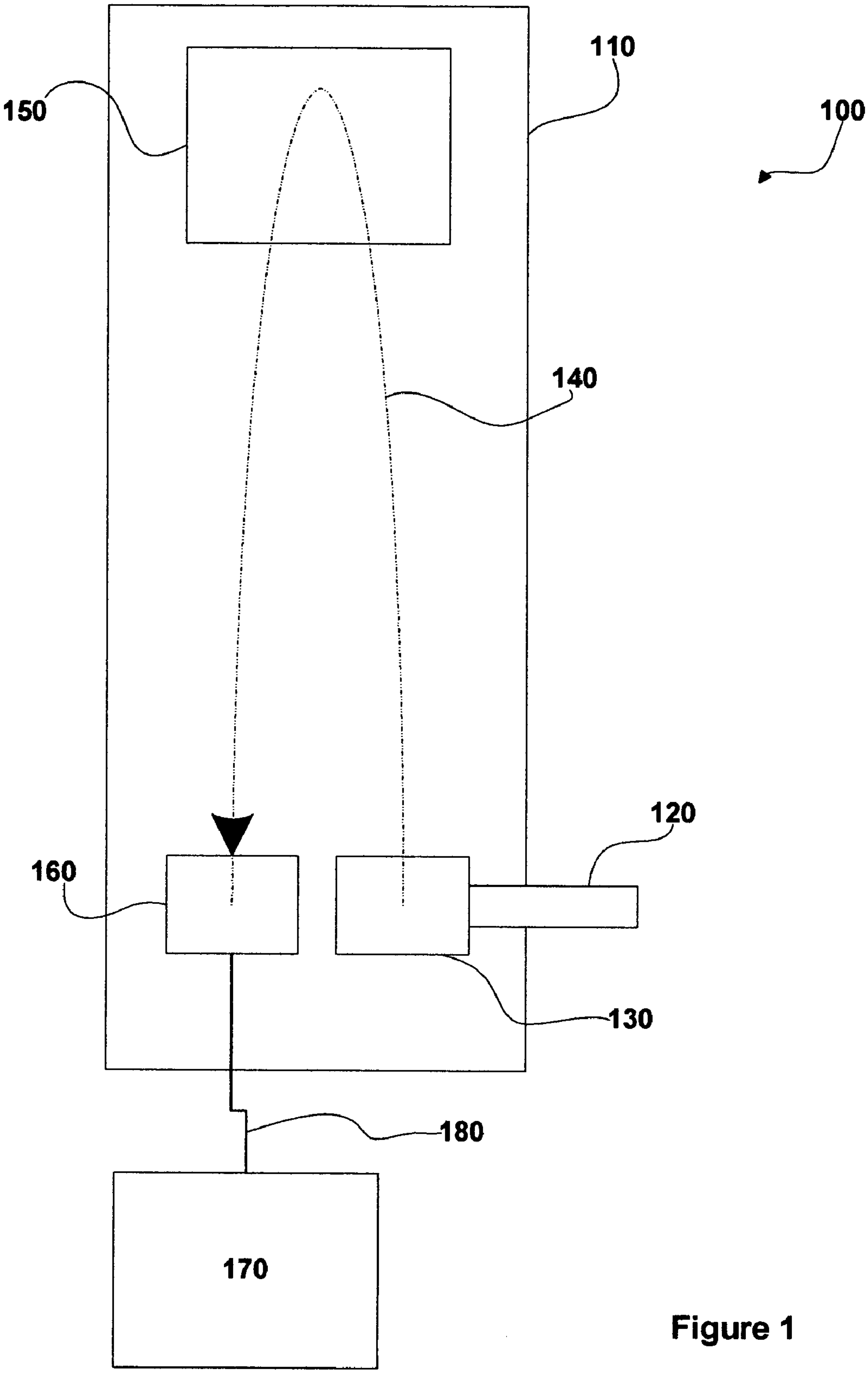
FIG. 1 illustrates a time-of-flight mass spectrometer, according to various embodiments of the invention.

In typical embodiments of the invention a plurality of time-to-digital converters is used to detect both the leading edge and trailing edge of a signal pulse received from a time-of-flight mass spectrometer. Using the detection times of the leading and trailing edges it is possible to distinguish signal pulses that result from the detection of more than one ion and to reduce or eliminate their effects. For example, a signal pulse resulting from the detection of more than one ion is usually wider in time than a signal pulse resulting from a single ion. Thus, in some embodiments, a signal pulse having a trailing edge more than a specific time after a leading edge is ignored. This eliminates mass shifts resulting from the multi-ion signal pulses.

These and other exemplary embodiments of the invention will now be described and explained in more detail with reference to the embodiments illustrated in the drawings. The features that can be derived from the description and the drawings may be used in other embodiments of the invention either individually or in any desired combination.

FIG. 1 illustrates a time-of-flight mass spectrometer (TOFMS) generally designated 100, according to various embodiments of the invention. TOFMS 100 includes an outer housing 110 which is typically configured to maintain a pressure differential between the outside atmosphere and an interior volume. An analyte is introduced into TOFMS 100 via a sample inlet 120. Sample inlet 120 can be a port, a probe, a chromatograph, a mass filter, a skimmer, a sample plate, an ion guide, a gas inlet, or the like. The analyte can be either neutral or previously ionized.

Within TOFMS 100 the analyte is received at an ion source 130. Ion source 130 can be any conventional continuous or pulsed source, such as a nanospray ion source, an electrospray ion source, an electron capture ion source, an electron impact source, a chemical ionization source, a photoionization source, a metastable ion source, an atmospheric pressure chemical ionization (APCI) source, a matrix assisted laser desorption ionization (MALDI) source, or the like. Ion source 130 is optionally configured to ionize neutral analyte if needed, and configured to accelerate ions into a trajectory 140. The dotted line used to illustrate trajectory 140 in FIG. 1 is but one example of many possible paths an accelerated ion may take. Ions are accelerated from ion source 130 in a "pulsed" manner such that their time-of-flight can be measured. This is accomplished by creating the ions over a very short time period, and/or using time dependent electric fields to accelerate the ions. Within outer housing 110 the accelerated ions optionally pass through one or more optional ion reflectors 150, on their way to a detector 160.

Detector 160 can be any detector that can be used to detect ions accelerated by ion source 130 in a time resolved manner. For example, Detector 160 can include an electron multiplier, an analog electrometer, a photomultiplier, a microchannel plate, or the like. Typically, detector 160 includes a mechanism for generating electrons in response to ions and at least one anode to collect the generated electrons.

Output from detector 160 is communicated to signal processing electronics 170 via an electronic coupling 180. For example, in some embodiments electrons resulting from the detection of an ion are collected at an anode (not shown) within detector 160 and then passed through electronic coupling 180 to an input of signal processing electronics 170.

TOFMS can be used to generate mass spectra by accelerating "bunches" of ions from ion source 130, detecting the accelerated ions at detector 160, and measuring their times-of-flight using signal processing electronics 170. As noted above, when given the same kinetic energy or accelerating potential, ions with greater mass-to-charge ratio (m/z) take longer to reach detector 160 than ions with lower m/z.

Figure 2A:
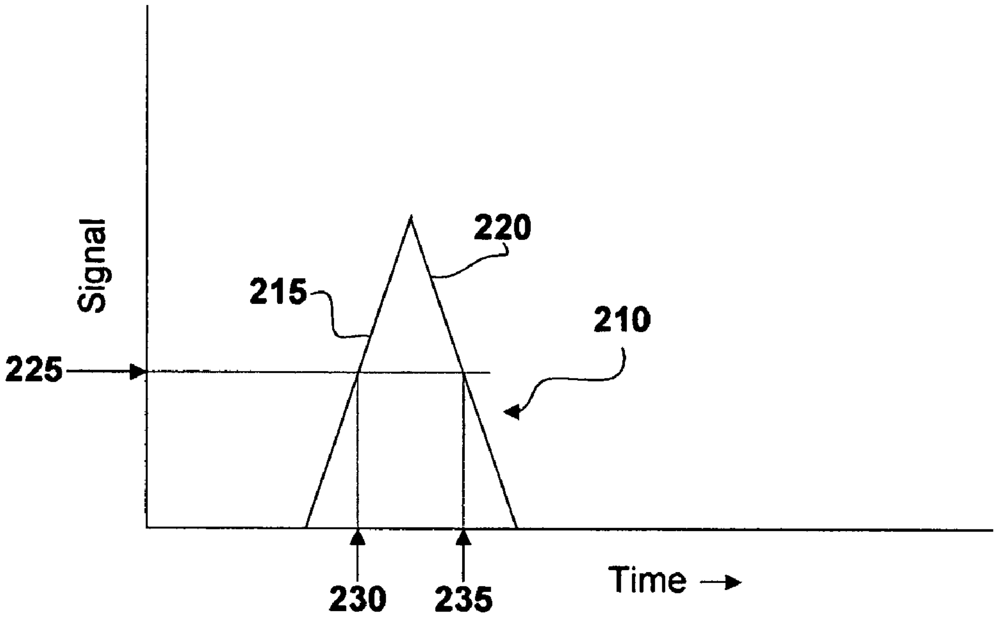
FIGS. 2A and 2B are illustrations of signals generated using the time-of-flight mass spectrometer of FIG. 1, according to various embodiments of the invention.
Figure 2B:
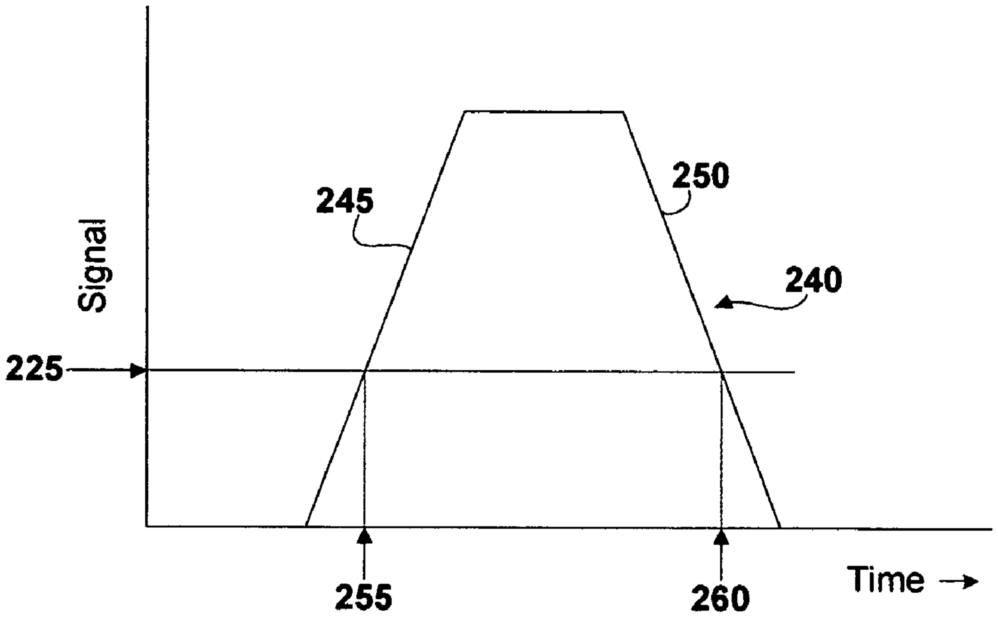

FIGS. 2A and 2B illustrate exemplary electronic signals that can be received by signal processing electronics 170 from detector 160. In FIG. 2A a signal pulse 210, such as may result from the detection of a single ion, is shown. Signal pulse 210 includes both a leading edge 215 and a trailing edge 220. As discussed further herein, leading edge 215 and trailing edge 220 may pass a signal level threshold 225 at time 230 and time 235, respectively.

In FIG. 2B a signal pulse 240, such as can result from the detection of more than one ion, is shown. Signal pulse 240 is wider in time than signal pulse 210, and can also be greater in magnitude. Thus, a leading edge 245 and a trailing edge 250 cross a signal level threshold 225 at time 255 and time 260, respectively. The temporal difference between times 255 and 260 is typically dependent on the number of ions whose detection resulted in the generation of signal pulse 240.

The shapes of signal pulses 210 and 240, as shown in FIGS. 2A and 2B, are illustrative only. In practice, the shapes of signal pulses received from detector 160 may vary widely.

Figure 3:
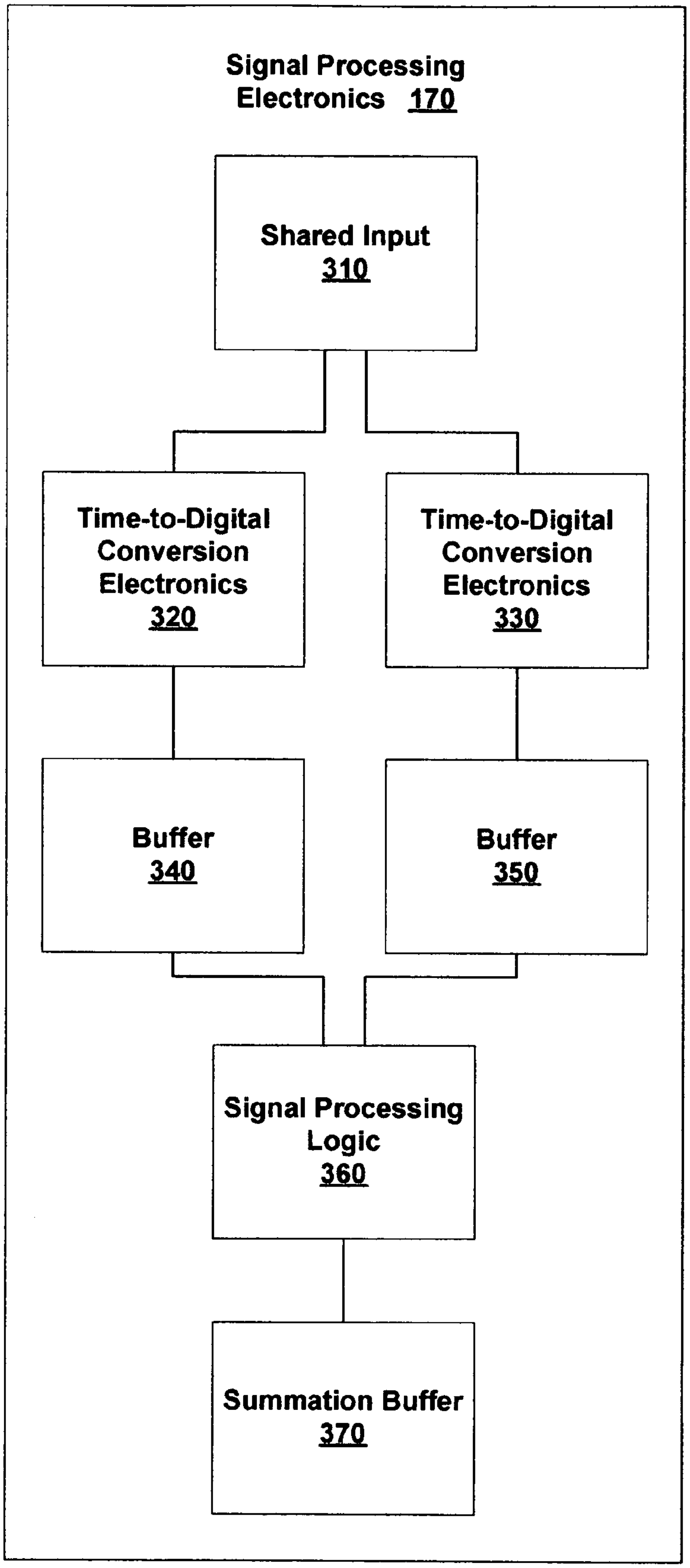
FIG. 3 is a schematic diagram of signal processing electronics, according to various embodiments of the invention.

FIG. 3 is a block diagram of signal processing electronics 170, according to various embodiments of the invention. Signal processing electronics 170 are configured to receive a signal including one or more signal pulses from, for example, detector 160, and to generate digital data representative of the received signal as a function of time. The signal is received at a shared input 310, which is optionally electronically coupled to a single anode within detector 160. Shared input 310 is configured to provide the received signal to two different circuits, a first time-to-digital conversion circuit 320 and a second time-to-digital conversion circuit 330. Typically, shared input 310 is configured such that time-to-digital conversion circuit 320 and time-to-digital conversion circuit 330 both receive essentially identical signals at the same time. However, in some embodiments, shared input 310 is configured to introduce a delay between the signals received by time-to-digital conversion circuit 330 and time-to-digital conversion circuit 320.

Time-to-digital conversion circuit 320 and 330 are both configured to receive an analog signal and to generate digital data therefrom. The resulting digital data are associated with one or more time bins (e.g., memory locations or time intervals) corresponding to a time the analog signal was received. For example, a typically embodiment of time-to-digital conversion circuit 320 can include 64K (65,536) time bins each 0.25 nanoseconds in width. The absolute time of the first time bin is determined by an external trigger signal. Any analog signal detected during the 0.25 nanoseconds associated with the first time bin results in the generation of digital data associated with the first time bin. Any analog signal detected during the next 0.25 nanoseconds results in the generation of digital data associated with the second time bin, etc. This process can continue during all 64K time bins. The resulting data is considered the result of one measurement cycle of TOFMS 100. The external trigger pulse can be a delayed signal and is typically associated with an event used to create, introduce or accelerate ions within TOFMS 100.

In some embodiments, time-to-digital conversion circuit 320 and 330 are configured to detect analog signals by comparing the input signal received from shared input 310 to a reference voltage (e.g., signal level threshold 225 of FIG. 2) using one or more discriminator. For example, time-to-digital conversion circuit 320 can include a discriminator (e.g., comparator) whose output is "zero" when the analog signal is less than the reference voltage and "one" when the analog signal becomes greater than the reference voltage. In this case time-to-digital conversion circuit 320 is configured to detect a rising edge of a signal pulse such as leading edge 215. The output resulting from the detection of the rising edge is associated with (e.g., stored in) the time bin corresponding to the time at which the rising edge was detected.

For the purposes of example, it is assumed herein that time-to-digital circuit 320 is configured to detect a leading edge of a signal pulse and that time-to-digital circuit 330 is configured to detect a corresponding trailing edge. Further, it is assumed that the detected signal pulse has a positive polarity, as illustrated in FIGS. 2A and 2B. Thus, the leading edge is the rising edge and the trailing edge is the falling edge. However, it will be appreciated that, in alternative embodiments, the roles of time-to-digital circuit 320 and time-to-digital circuit 330 can be reversed and/or the polarity of a signal pulse can be negative rather than positive. In general, time-to-digital conversion circuit 320 is configured to detect one edge of a signal pulse and time-to-digital conversion circuit 330 is configured to detect the other edge of the same signal pulse.

In some embodiments, shared input 310, time-to-digital conversion circuit 320 and/or time-to-digital conversion circuit 330 include a constant fraction discriminator.

The outputs of time-to-digital conversion circuit 320 and 330 are stored in optional buffers 340 and 350, respectively. Typically, buffers 340 and 350 contain a separate field to store a value associated with each time bin of time-to-digital conversion circuit 320 and 330. In those embodiments where the outputs of time-to-digital conversion circuit 320 and 330 are 1-bit (e.g. either zero or one), the corresponding fields in buffers 340 and 350 can be one bit wide. Thus, if time-to-digital circuit 320 is configured to store data in 32K time bins then buffer 340 can be 32K bits wide.

As discussed further elsewhere herein, buffers 340 and 350 are optional in embodiments where the outputs of time-to-digital conversion circuit 320 and 330 are processed by a signal processing logic 360 without intermediate storage in a buffer configured to store the results of an entire measurement cycle of TOFMS 100.

Signal processing logic 360 is configured to receive data generated by the time-to-digital conversion circuit 320 and 330 and to process the received data such that signal pulses resulting from detection of a single ion at detector 160 are treated differently from those signal pulses resulting from detection of two or more ions. When a signal pulse results from the detection of more than one ion, the resulting data can be either discarded or manipulated in order to compensate for the fact that more than one ion contributed to the pulse. Signal processing logic 360 can be embodied in software, firmware, hardware or a combination thereof.

In various embodiments, those signal pulses resulting from detection of a single ion are distinguished from those signal pulses that result from detection of more than one ion by using the time difference between the leading edge and the trailing edge of each signal pulse. For example, signal pulse 210 (FIG. 2A) can be identified as being the result of a single ion based on the difference between time 230 as measured by time-to-digital conversion circuit 320 and time 235 as determined by time-to-digital conversion circuit 330. In comparison, signal pulse 240 (FIG. 2B) can be identified as being the result of two, three or more ions based on the difference between time 255 and time 260.

In various embodiments, signal pulses determined to result from more than one ion are avoided in the output of signal processing logic 360. In these embodiments, the data resulting from the detection of a leading edge is deleted (e.g., zeroed) if a trailing edge is not detected within a required time interval or number of time bins. Thus, in these embodiments, the output of signal processing logic 360 will include only data resulting from the detection of single ions.

In some of these embodiments, signal processing logic 360 is simplified by directly comparing the time bin associated with time 230 in time-to-digital conversion circuit 320 configured to detect the leading edge, with the time bin associated with the time 235 in the time-to-digital conversion circuit 330 configured to detect the trailing edge. For example, these two time bins may be compared using an AND gate. This comparison is optionally performed in real time such that buffers 340 and 350 are unnecessary. This comparison can be simplified by delaying the signal received by time-to-digital conversion circuit 320 configured to detect leading edge 215 such that leading edge 215 and trailing edge 220 are received by time-to-digital conversion circuits 320 and 330 at essentially the same absolute time. Thus, the $X^{th}$ time bin of time-to-digital conversion circuit 320 can be AND'ed with the $X^{th}$ time bin of time-to-digital conversion circuit 330 to generate the output of signal processing logic 360. Only if an event (e.g., value of "one") was stored in both of these time bins will a received signal pulse be represented in the output of signal processing logic 360. Alternatively a trigger signal can be delayed to achieve a similar result.

Figure 4A:
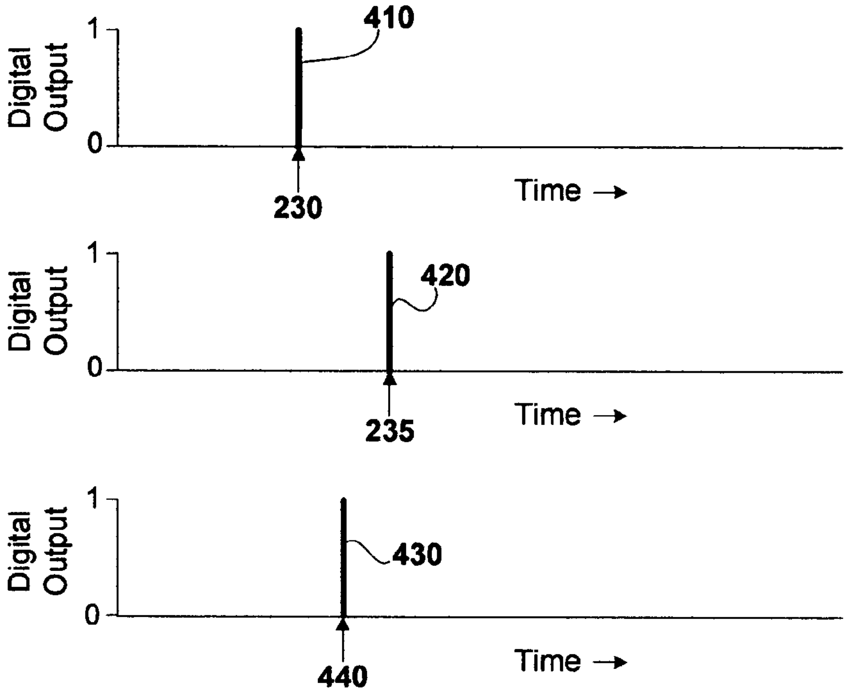
FIGS. 4A and 4B are illustrations of outputs generated using the time-to-digital conversion electronics and signal processing logic of FIG. 3, according to various embodiments of the invention.
Figure 4B:
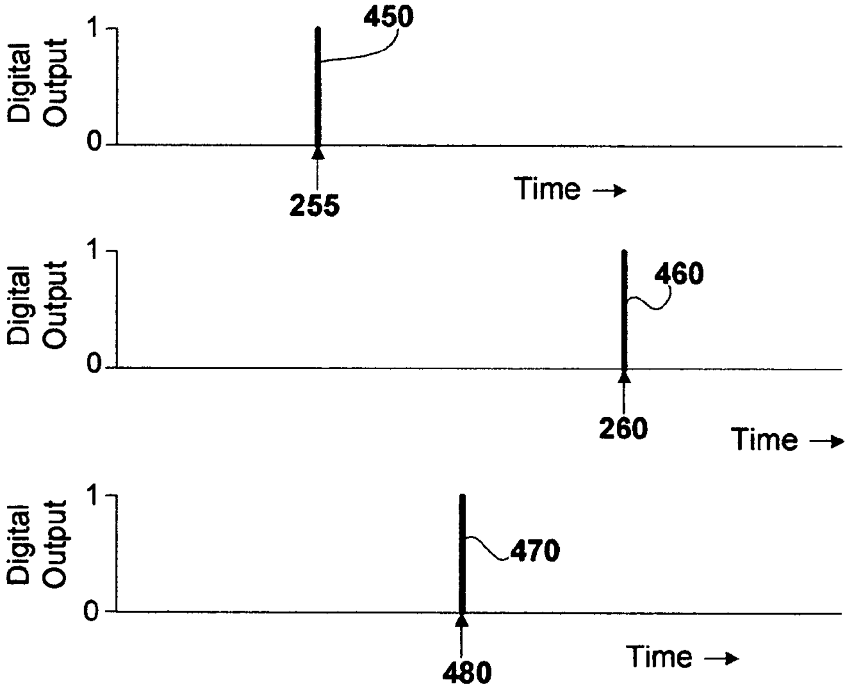

In alternative embodiments, signal processing logic 360 is configured to average the time a leading edge is detected with the time a corresponding trailing edge is detected. Examples are shown in FIGS. 4A and 4B. FIG. 4A includes three graphs showing the output of time-to-digital conversion circuit 320, the output of time-to-digital conversion circuit 330, and the resulting output of signal processing electronics 360, from top to bottom respectively. In the top graph a digital output 410 is "one" at time 230 corresponding to the detection of leading edge 215 of signal pulse 210 (FIG. 2A). In the middle graph a digital output 420 is "one" at time 235 corresponding to the detection of trailing edge 220. In the bottom graph, illustrating the output of signal processing logic 360, a digital output 430 is "one" at a time 440 corresponding to an average of time 230 and time 235. This average is optionally a weighted average.

FIG. 4B includes a similar set of graphs corresponding to detection of the signal pulse shown in FIG. 2B. A digital output 450 of time-to-digital conversion circuit 320 occurs at time 255. A digital output 460 of time-to-digital conversion circuit 330 occurs at time 260. A resulting digital output 470 of signal processing logic 360 is at a time 480, where the time 480 is derived from the times 255 and 260. Note that because signal pulse 240 resulted from the detection of more than one ion, the difference between time 255 and time 480 is greater than the difference between time 230 and time 440.

Typically, the processes illustrated by FIGS. 4A and 4B are performed using data stored in buffers 340 and 350. Further, the same approach is optionally applied to all detected signal pulses, regardless of whether they result from the detection of one or more than one ion.

In alternative embodiments, the output of signal processing logic 360 is more than one bit per time bin. In these embodiments, the output of signal processing logic 360 is optionally scaled responsive to the difference between the time a leading edge is detected and a trailing edge is detected. For example, if this time difference is a difference that is usually associated with the detection of two ions, then the output may be scaled to a value of "two." If this time difference is one that is usually associated with the detection of three ions, then the output may be scaled to a value of "three," etc.

The output of signal processing logic 360 can be added to an optional summation buffer 370. For example, is some embodiments TOFMS 100 is operated in the cyclic mode and the results of each data acquisition cycle are added to summation buffer 370. After a sufficient number of cycles, the data stored within summation buffer 370 may be interpreted as a mass spectrum. The summation process occurs after processing using signal processing logic 360.

Figure 5:
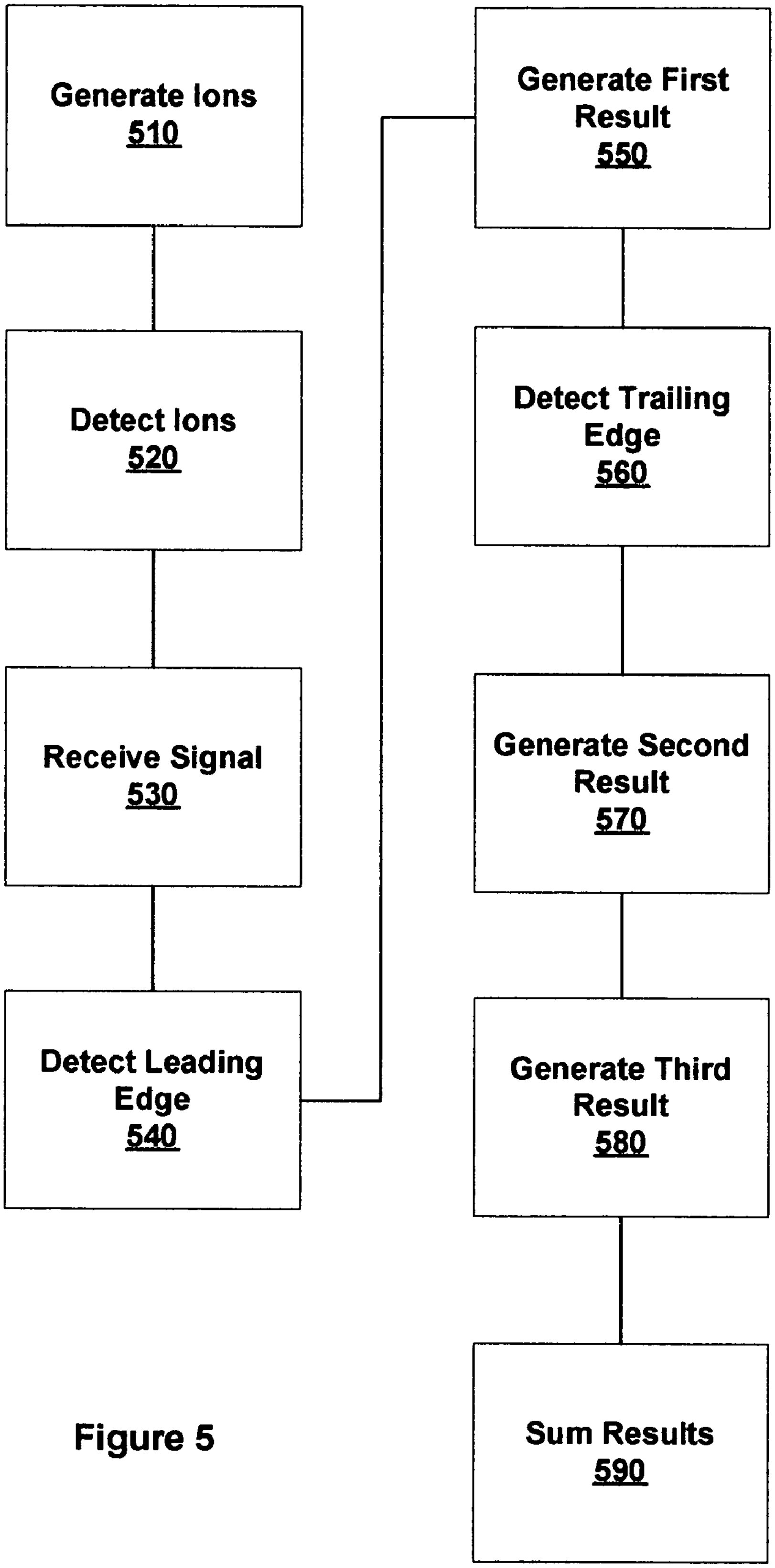
FIG. 5 is a flowchart illustrating a method of generating a mass spectrum, according to various embodiments of the invention.

FIG. 5 is a flow diagram illustrating a method of generating a mass spectrum, according to various embodiments of the invention. FIG. 5 also illustrates, in steps 530–590, a method of using signal processing electronics 170, according to various embodiments of the invention.

In a generate ions step 510, ions are generated for analysis in TOFMS 100. The ions can be generated using electron impact, chemical ionization, MALDI, laser ionization, atmospheric pressure ionization, electron capture ionization, metastable ionization, ion fragmentation, plasma desorption or any other ionization method used in mass spectrometry. The resulting ions are either generated within ion source 130 or introduced into TOFMS 100 via sample inlet 120.

In a detect ions step 520, the ions generated in generate ions step 510 are detected in a manner such that their m/z values can be deduced from their detection time. For example, ions are optionally accelerated through a linear or reflectron time-of-flight mass spectrometer and detected using a microchannel plate detector. Other means of separating ions in time and detecting them are known in the art, and can be adapted to the present invention.

In a receive signal step 530, an output signal from detector 160 is received by shared input 310. The received signal is optionally the result of electrons collected on a single anode. Using shared input 310 the received signal is passed on to both time-to-digital conversion circuit 320 and time-to-digital conversion circuit 330.

In a detect leading edge step 540, time-to-digital conversion circuit 320 is used to detect a leading edge of a signal pulse within the signal received by shared input 310 in receive signal step 530. The detected leading edge can be of either positive or negative polarity. Typically, the detection occurs by comparing the received signal with a reference voltage.

In a generate first result step 550, a first digital output is generated using time-to-digital conversion circuit 320 responsive to the detection of the leading edge in detect leading edge step 540. The digital output is associated with a time bin and is, optionally, a 1-bit output. For example, in a typical embodiment, a one is indicative that a leading edge was detected and a zero is indicative that no leading edge was detected during the associated time bin.

In a detect trailing edge step 560 time-to-digital conversion circuit 330 is used to detect a trailing edge of the signal pulse within the signal received by shared input 310 in receive signal step 530. Typically, the trailing edge will be of opposite polarity as compared to the leading edge. The detected trailing edge can be detected by comparing the received signal with a reference voltage. This reference voltage is optionally the same as the reference voltage used in detect leading edge step 540.

In a generate second result step 570 a second digital output is generated using time-to-digital conversion circuit 330, responsive to the detection of the trailing edge in detect trailing edge step 560. As with the first digital output, the second digital output is associated with a time bin and is, typically, a 1-bit output.

In a generate third result step 580 a third digital output is generated using signal processing logic 360. The third digital output is associated with a time bin and is responsive to the first digital output and the second digital output, generated in generate first result step 550 and generate second result step 570, respectively. In some embodiments, the time bin which the third digital output is associated with is responsive to an average of the time bins associated with the first and second digital outputs. In some embodiments, the third digital output is dependent on a time difference between the detection of the leading edge in detect leading edge step 540 and the detection of the trailing edge in detect trailing edge step 560. For example, in one embodiment the third digital output is dependent on whether the trailing edge is detected within a specific time after detection of the leading edge. In some embodiments, the third digital output and/or associated time bin are responsive to whether the signal pulse resulted from the detection of one ion or from the detection of more than one ion.

In an optional sum results step 590 the digital output of signal processing logic 360 generated in generate third result step 580 is added to summation buffer 370. Steps 510 through 590 are optionally performed repeatedly such that data representative of a mass spectrum accumulates in summation buffer 370. In alternative embodiments the outputs of time-to-digital conversion circuit 320 and 330 are stored in Buffers 340 and 350, respectively, in steps not shown in FIG. 5.

Several embodiments are specifically illustrated and/or described herein. However, it will be appreciated that modifications and variations are covered by the above teachings and within the scope of the appended claims without departing from the spirit and intended scope thereof. For example, signal processing electronics 170 can be adapted for use in other types of mass spectrometry, ion mobility spectrometry, particle or photon counting, signal processing, or any other application in which time-to-digital converters are used. Further, a plurality of signal processing electronics 170 can be used in systems having more than one anode per detector. In these cases, there can be an instance of signal processing electronics 170 for each anode. Further, time-to-digital conversion circuits 320 and 330 can share components. For example, in one embodiment, time-to-digital conversion circuits 320 and 330 can share a single discriminator having two outputs, a first output that is responsive to rising edges and a second output that is responsive to falling edges.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

We claim:

1. A pulse detection system for a time-of-flight mass spectrometer, the pulse detection system comprising:

a first circuit configured to generate a first result within one of a plurality of time bins responsive to detection of a leading edge of a signal pulse, the signal pulse being generated using the time-of-flight mass spectrometer;

a second circuit configured to generate a second result responsive to detection of a trailing edge of the signal pulse; and logic configured to generate a third result, using the first result and the second result, indicative of whether or not the signal pulse was generated by the detection of more than one ion, the third result having a predetermined value if a difference between a time associated with the first result and a time associated with the second result is greater than a specified time difference.

2. The pulse detection system of claim 1, wherein the logic is configured to use the first result to generate the third result before the first result is added to a summation of results.

3. The pulse detection system of claim 1, further including a buffer configured to store the first result, and wherein the logic is configured to use the first result to generate the third result before the first result is added to a summation of results.

4. The pulse detection system of claim 1, wherein the first circuit and/or the second circuit includes a constant fraction discriminator.

5. The pulse detection system of claim 1, wherein the first circuit is configured to detect a signal pulse edge of a predetermined polarity, and the second circuit is configured to detect a signal pulse edge of an opposite polarity.

6. The pulse detection system of claim 1, wherein the first circuit and/or the second circuit includes a discriminator configured to compare the signal pulse with a reference voltage.

7. A time-of-flight mass spectrometer comprising:

an ion source;

an ion detector configured to detect ions received from the ion source; and a pulse detection system including first time-to-digital conversion electronics configured to detect a leading edge of a signal pulse generated by the ion detector, and to generate a first result responsive to the detection of the leading edge, the first result being associated with a first time, second time-to-digital conversion electronics configured to detect a trailing edge of the signal pulse and to generate a second result responsive to the detection of the trailing edge, the second result being associated with a second time, and logic configured to generate a third result using the first time and the second time, the result having a predetermined value if the difference between the first and second times exceeds a specified time difference.

8. The time-of-flight mass spectrometer of claim 7, further including a summation buffer configured to store a summation of results including the third result.

9. The time-of-flight mass spectrometer of claim 7, wherein the ion detector includes a detector anode, and the first time-to-digital conversion electronics and the second time-to-digital electronics are both configured to receive essentially a same signal from the detector anode.

10. The time-of-flight mass spectrometer of claim 7, wherein a signal pulse generated by the detection of more than one ion is prevented by the pulse detection system from causing a mass shift in a resulting mass spectrum.

* * * * *